United States Patent
Centonza et al.

(10) Patent No.: US 12,177,693 B2
(45) Date of Patent: Dec. 24, 2024

(54) SPLIT ARCHITECTURE RADIO ACCESS NETWORK NODE PROVIDING LOW LEVEL INDICATION OF STATUS OR FAILURE AND RESPONSIVE INSTRUCTIONS

(71) Applicant: Telefonaktiebolaget LM Ericsson (PUBL), Stockholm (SE)

(72) Inventors: Angelo Centonza, Torrenueva Costa Granada (ES); Lars Falk, Malmö (SE); Ali Nader, Malmö (SE); Tahmineh Torabian Esfahani, Linköping (SE); Daniel Henriksson, Linköping (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 566 days.

(21) Appl. No.: 17/607,273

(22) PCT Filed: Apr. 17, 2020

(86) PCT No.: PCT/IB2020/053662
§ 371 (c)(1),
(2) Date: Oct. 28, 2021

(87) PCT Pub. No.: WO2020/222069
PCT Pub. Date: Nov. 5, 2020

(65) Prior Publication Data
US 2022/0174515 A1   Jun. 2, 2022

Related U.S. Application Data

(60) Provisional application No. 62/842,058, filed on May 2, 2019.

(51) Int. Cl.
*H04W 24/04* (2009.01)
*H04W 4/90* (2018.01)
(Continued)

(52) U.S. Cl.
CPC ............ *H04W 24/04* (2013.01); *H04W 4/90* (2018.02); *H04W 68/005* (2013.01); *H04W 92/24* (2013.01)

(58) Field of Classification Search
CPC ...... H04W 24/04; H04W 4/90; H04W 68/005
(Continued)

(56) References Cited

U.S. PATENT DOCUMENTS

2019/0215756 A1* 7/2019 Park ................ H04W 24/10
2022/0174563 A1* 6/2022 Xu ................... H04W 36/0058

FOREIGN PATENT DOCUMENTS

WO  2018 175817 A1   9/2018
WO  2018 225988 A1  12/2018

OTHER PUBLICATIONS

PCT International Search Report issued for International application No. PCT/IB2020/053662—Jun. 9, 2020.
(Continued)

*Primary Examiner* — Faisal Choudhury
(74) *Attorney, Agent, or Firm* — Weisberg I.P. Law, P.A.

(57) ABSTRACT

A method is performed by a distributed unit of a radio access network node having a split architecture. The method includes determining a status or error of the distributed unit. The DU sends, to a control unit of the radio access network node, an indication indicating the status or error of the distributed unit. The message indicates the status or error of the distributed unit for at least one cell served by the distributed unit and/or at least one functionality performed by the distributed unit. The distributed unit receives instructions from the control unit of the radio access network node, and the instructions are at least partially based on the indicated status or error.

19 Claims, 12 Drawing Sheets

(51) Int. Cl.
    *H04W 68/00*    (2009.01)
    *H04W 92/24*    (2009.01)
(58) Field of Classification Search
    USPC .......................................................... 370/329
    See application file for complete search history.

(56) References Cited

OTHER PUBLICATIONS

3GPP TSG RAN WG3 NR #99; Athens, Greece; Source: Ericsson; Title: (TP for NSA BL CR) Corrections on cell related information (Tdoc—R3-181371—Feb. 26-Mar. 2, 2018.
3GPP TSG-RAN WG3#NR Adhoc 1807; Montreal, Canada; Source: Nokia, Nokia Shanghai Bell; Title: (TP for NR BL CR for TS 38.473) F1 Load management (R3-183859)—Jul. 2-6, 2018.
PCT Written Opinion of the International Searching Authority issued for International application No. PCT/IB2020/053662—Jun. 9, 2020.

* cited by examiner

SPLIT ARCHITECTURE RADIO ACCESS NETWORK NODE PROVIDING LOW LEVEL INDICATION OF STATUS OR FAILURE AND RESPONSIVE INSTRUCTIONS

PRIORITY

This nonprovisional application is a U.S. National Stage Filing under 35 U.S.C. § 371 of International Patent Application Serial No. PCT/IB2020/053662 filed Apr. 17, 2020 and entitled "Split Architecture Radio Access Network Node Providing Low Level Indication of Status or Failure and Responsive Instructions" which claims priority to U.S. Provisional Patent Application No. 62/842,058 filed May 2, 2019 both of which are hereby incorporated by reference in their entirety.

TECHNICAL FIELD

The present disclosure relates, in general, to wireless communications and, more particularly, systems and methods for radio access network low level failure reporting.

BACKGROUND

The new Radio Access Network (RAN) node introduced for the next generation of telecommunication, also referred to as 5th Generation (5G) or New Radio (NR) is called next generation NodeB (gNB). FIG. 1 illustrates an example architecture for a NR Radio Access Network (RAN) with split architecture gNBs. The architecture also introduces a split of the gNB in two different parts, the Central Unit (CU) and the Distributed Unit (DU). The CU will have responsibility of high-level user equipment (UE) handling and be the termination point for control interfaces like Next Generation Application Protocol (NGAP), Xn, and E1. The CU will also be responsible UE related functionality like mobility, load balancing, etc.

The CU can be connected to one or more DUs that will handle cell functionality like scheduling and management of air interface, amongst other similar functionality.

The CU and DU are connected using the F1 interface such as that specified in the 3GPP TS 38.473, for example. It contains procedures for interface establishment, unlocking cells, configuration updates, paging, Public Warning Systems (PWS), etc.

According to current specifications, in addition to UE associated signalling, the F1 interface enables exchange of non-UE associated information. Example of relevant non-UE associated F1 procedures related to the present invention and used/initiated in the event of a failure in the gNodeB-Distributed Unit (gNB-DU) are: RESET, ERROR INDICATION, F1 SETUP FAILURE, GNB-DU CONFIGURATION UPDATE FAILURE, and GNB-DU STATUS INDICATION.

FIG. 2 illustrates the gNB status indication procedure. Specifically, the F1 procedure gNB-DU Status indication can be used by the DU to feedback its status by sending the GNB-DU STATUS INDICATION as depicted.

In the GNB-DU STATUS INDICATION, the DU informs the CU that the DU is overloaded so the CU can apply overload protection. The DU can also inform the CU that the overloaded situation has passed and that the overload protection in the CU is no longer needed.

As specified in Section 9.2.1.15 of 3GPP TS 38.473, the GNB-DU status indication is sent by the gNB-DU to indicate to the gNodeB-Central Unit (gNB-CU) its status of overload. For example, the direction is from the gNB-DU to the gNB-CU. The GNB-DU STATUS INDICATION is currently defined in Section 9.2.1.15 of 3GPP TS 38.473.

Common to other F1 procedures for indicating failure, feedback from a DU to a CU is via the Cause information element (IE) that can be included in a number of different response messages.

The F1 procedure ERROR INDICATION can be originated by gNB-DU and/or gNB-CU in order to report detected errors in one incoming message that cannot be reported by an appropriate failure message. FIGS. 3A and 3B illustrate signalling diagrams for situations where the ERROR INDICATION originates from the gNB-CU and gNB-DU, respectively.

The ERROR INDICATION message contains at least either the Cause IE or the Criticality Diagnostics IE that the cause is set to appropriate value.

As specified further in Section 9.2.1.3 of 3GPP TS 38.473, this message is sent by both the gNB-CU and the gNB-DU and is used to indicate that some error has been detected in the node. The message may be sent in both directions, i.e., gNB-CU→gNB-DU and gNB-DU→gNB-CU.

The ERROR INDICATION is currently defined in Section 9.2.1.3 of 3GPP TS 38.47.

As specified in Section 9.3.1.2 of 3GPP TS 38.473, the purpose of the Cause IE is to indicate the reason for a particular event for the F1AP protocol. Section 9.3.1.2 of 3GPP TS 38.473 designates certain IE/Group names for the Cause IE.

In the Cause IE, it may be possible to specify overload or other reasons why the DU is not able to perform a requested action.

There currently exist certain challenges. Common to all the aforementioned procedures used in the event of some type of failure or issue in the DU, there is currently no method of informing the CU about failures of specific sub-systems or functions within the DU. For example, sub-system failures may refer to failures related to a particular cell or subset of cells out of a plurality of cells in the DU or failures related to certain functionality within one or more cells within the DU. Additionally, the current procedures fail to convey a severity of the failures, which may influence how the CU responds to the failures.

For example, in the event of paging overload in a DU, there is currently no way to inform the CU about the paging related error/issue. Furthermore, in case the overload is only manifested in a certain cell or cells of the DU, there is no method for providing such information to the CU. If such information may be conveyed to the CU, the CU could take more targeted action to correct or mitigate the failures such as, for example, to reconfigure the paging related parameters (e.g., number of paging occasions) to get more throughput as opposed to more drastic measures.

Another example is related to broadcast of system information. Depending on the operator-configured settings related to the functionality in combination with deployment criteria of the cells within the DU (e.g., the coverage each cell within the DU is supposed to cover), for certain cells, in order to reach UEs at cell edge, the system information blocks need to be transmitted several times within the relevant configured system information window. During the gNB/DU operation, and at increased UE traffic, the gNB might detect that for some of its cells, the air resources needed for broadcast of system information are competing with air resources needed for high-priority network (NW) access UE-related traffic. As a result, some of the broadcast of system information block repetitions may be compromised, which may cause that some UEs on the edge of the cell to suffer issues resulting from missing, partial, or outdated system information.

In both examples above (in addition to other cases that may be applicable), the problem or failure can be local or limited to a cell (set of cells) within the DU. For example, the cells within the DU might have been deployed on hardware (HW) blocks with different capacity. Or similarly, the cells within the DU might be of different air interface capability due to different bandwidths, etc.

As a result, for the example failures mentioned above, currently (e.g., in the unsolicited GNB-DU STATUS INDICATION) the failure status from the DU to CU may be conveyed with status set to "overloaded." Alternately, other procedures such as ERROR INDICATION can be used where the generic "Cause" value can be set to "No Radio Resources Available." None of these methods have high enough granularity to convey information to the CU about whereabouts and severity (e.g., load level) of the issue within the DU. As a result, the CU may need manual operation or to deactivate the complete DU (leading to NW outage) to address the problem, rather than being able to pinpoint the issue and potentially reconfigure/deactivate a certain cell within the DU.

SUMMARY

Certain aspects of the present disclosure and their embodiments may provide solutions to these or other challenges. For example, certain embodiments introduce means in the interfaces within split architecture portions of a Radio Access Network (RAN) node (e.g., in the F1 interface between the Central Unit (CU) and Distributed Unit (DU) in a network node such as a gNodeB (gNB)) for conveying failure/warning/status information with high granularity. As a result, the CU may take proper actions for optimizing network operations without resorting to manual operation or other drastic operations that may lead to network outage(s). As specific example, the failure/warning/status information may be specified on a cell level or even further. In this manner, the CU may address the failure/warning/status conditions on a cellular (or finer) level.

According to certain embodiments, a method is performed by a DU of a radio access network node having a split architecture. The method includes determining a status or error of the DU and sending, to a CU of the radio access network node, an indication indicating the status or error of the DU. The message indicates the status or error of the DU for at least one cell served by the DU and/or at least one functionality performed by the DU. The method further includes the DU receiving instructions from the CU. The instructions are at least partially based on the indicated status or error.

According to certain embodiments, a radio access network node having a split architecture includes a DU that has processing circuitry configured to determine a status or error of the DU and send, to a CU of the radio access network node, an indication indicating the status or error of the DU. The message indicates the status or error of the DU for at least one cell served by the DU and/or at least one functionality performed by the DU. The processing circuitry receives instructions from the CU. The instructions are at least partially based on the indicated status or error.

According to certain embodiments, a method is performed by a CU of a radio access network node having a split architecture. The method includes receiving an indication from a DU of the radio access network node indicating a status or error of the DU. The message indicates the status or error of the DU for at least one cell served by the DU and/or at least one functionality performed by the DU. The DU sends instructions to the DU, and the instructions are at least partially based on the indicated status or error.

According to certain embodiments, a radio access network node having a split architecture includes a DU that has processing circuitry configured to receive an indication from a DU of the radio access network node indicating a status or error of the DU. The message indicates the status or error of the DU for at least one cell served by the DU and/or at least one functionality performed by the DU. The processing circuitry is configured to send instructions to the DU, and the instructions are at least partially based on the indicated status or error.

Certain embodiments may provide one or more of the following technical advantage(s). For example, by providing indications on a cellular (or finer) level, the CU may take targeted action to reconfigure the DU with respect to those specific cell(s). As a result, the impact on the network may be limited, thereby leading to less network outage time and requiring less manual configuration for the network. Additionally, the indications may provide high-granularity insight in the 5G multi-vendor split architecture, which may be further used to improve the performance of the network.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
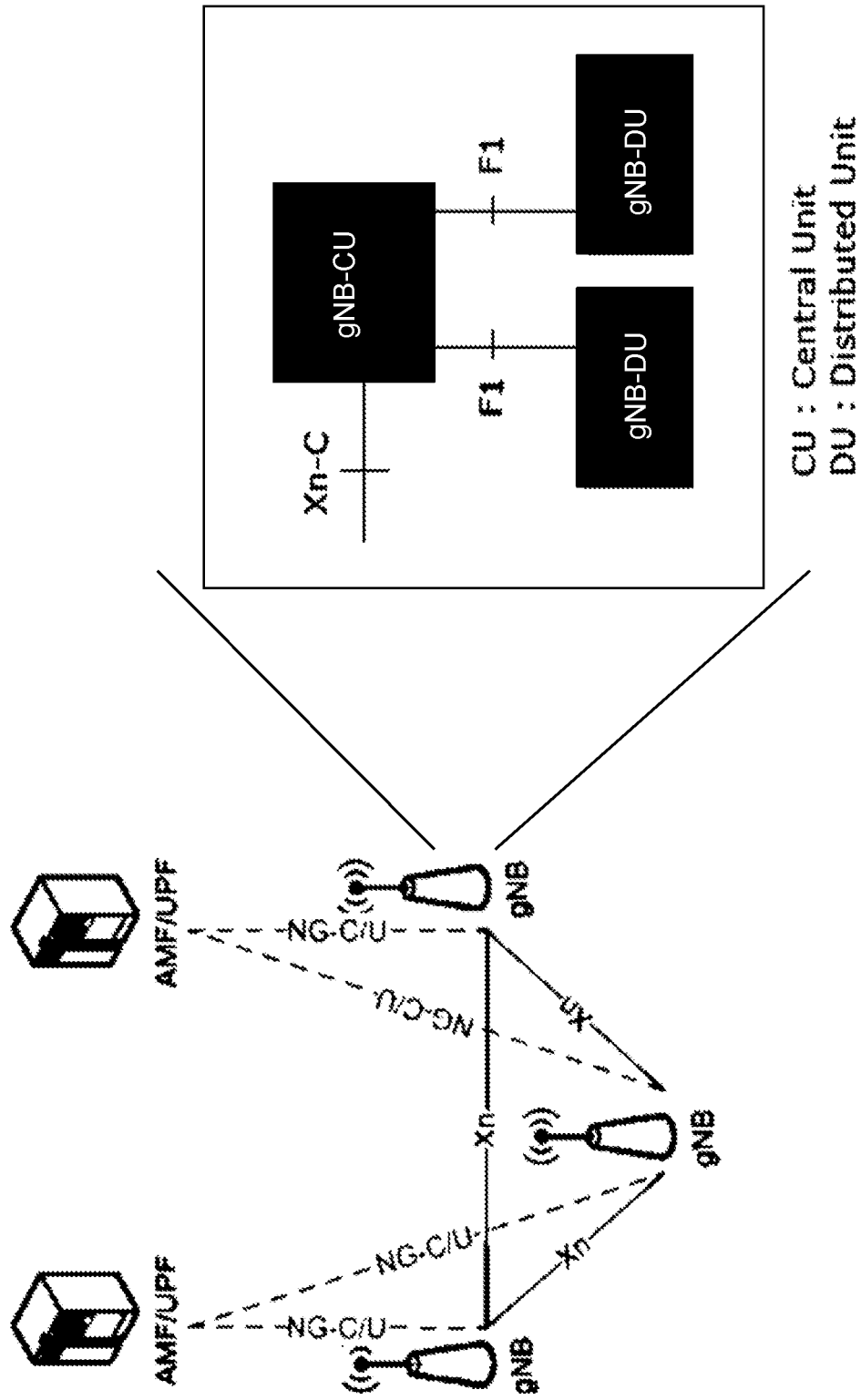
FIG. 1 illustrates an example architecture for a NR RAN with split architecture gNBs.
Figure 2:
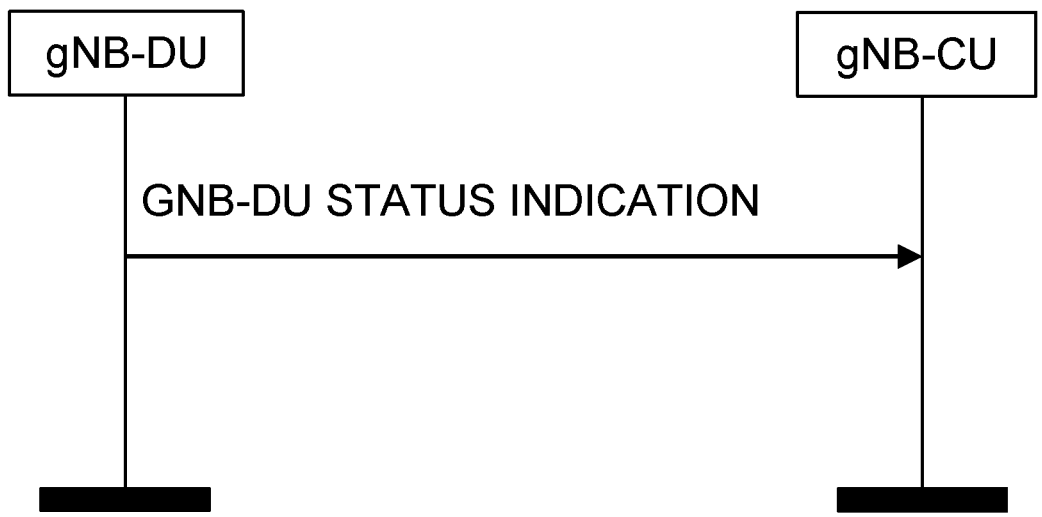
FIG. 2 illustrates the gNB status indication procedure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

According to, it is proposed that the F1 interface (or any interface between split portions of a RAN node having a split architecture) is configured for conveying failure/warning/status information with high granularity so that proper actions can be taken by the CU of a gNB for optimizing NW operations. It may be noted, however, that even though certain embodiments described herein focus on the message conveyed northbound (e.g., from the DU to the CU) in the split architecture, the methods, systems, techniques, and solutions are equally applicable to the other direction such as, for example, in cases where CU indicates ERROR to the DU or when the DU initiates procedures conveying configurations toward the CU.

According to certain embodiments, the existing solicited/unsolicited DU results to CU are extended to carry information about which cells (all/or a list thereof) that are relevant to the problem. Non-limiting examples of solicited results are response/reject messages to requests (e.g. configuration/F1 Setup/etc.) coming from CU to DU. In a particular embodiment, for example, the gNB-DU Status Indication may be extended to indicate to which cell or cells that the indicated status applies. In this manner, the DU may indicate the particular cell or cells that are overloaded or otherwise encountering problems. This may allow the CU to take targeted action to resolve the issue(s). For example, the CU may provide instructions to the DU in response to the indications provided by the DU about the status or error of the DU on a per-cell basis. The CU may provide instructions including reconfiguration information that may be at least partially based on the indicated status or error. This aspect may be combined with other aspects disclosed herein and detailed below.

In certain embodiments, the F1 interface is extended to carry information of relevant "functions" involved in the status/result/response reported. Some non-limiting examples of such "functions" that may be indicated via messaging over the extended F1 interface are "Paging", "System Information", "user traffic", or alike.

According to certain other embodiments, in response to a faulty/non-optimal configuration provided by the CU to DU, the DU may indicate which parameter that was non-optimal or faulty. In some embodiments, such indication can be done in a generic manner such as, for example, where the indication indicates that the problem is with the nth parameter (or a list of parameter indices), where the parameters are earlier configured by the CU (e.g., in a configuration update message).

In certain embodiments, the STATUS/ERROR (or other messages, including newly introduced messages) is extended to carry a freeform set of bits of a certain length (e.g., an ASN.1 bitstream/string) with or without detailed standardized contents. For example, the bitstream may be split into subparts such as, for example, functionality, issue, severity, which may be separated, for example, by tag-length-value or predefined length of various subparts carrying information about functionality, issue, and severity thereof, respectively. In certain embodiments, the CU or DU of the gNB or each split portion of the RAN node may then point via indices to a predefined set of functions/issue/severity, such as, for example, [3, 5, 9], which may be looked up in a table. For example, "3" may indicate an issue with a paging function, "5" may indicate that the issue is an overload issue, and "9" may indicate the severity on a predetermined scale. Accordingly, the receiving CU or DU may interpret the information from the indicated indices and take appropriate action. In some embodiments, the contents may not standardized (or may be in addition to standardized values) and the bitstream may be tailored by a vendor (same vendor CU-DU deployment) or, alternatively, by an operator (same/different vendor CU-DU deployment) to carry information between the nodes in the split architecture. For example, an operator may define his/her own table of [functionality, issue, severity], or an operator may redefine the contents of the bitstream completely and communicate it to the vendors.

According to certain embodiments, a method is provided to report events affecting the gNB-DU performance with a granularity of at least per cell. The method may be provided as part of an existing procedure or as a new procedure. For example, the gNB-DU Status Indication message may be extended to could be used to provide higher granularity event information from gNB-DU to gNB-CU.

In certain embodiments, the gNB-DU Status Indication may contain a list of cells affected by the overload condition indicated in the message. In some embodiments, for each cell, one or more specific performance events may be signalled. For example, each cell could be associated to one, several, or all of the following events:

Paging Overload—In certain embodiments, a message or indication is sent by the gNB-DU on a per cell basis when the DU realizes that paging resources are in overload. When the gNB-CU receives an indication from the gNB-DU stating that one gNB-DU cell is suffering from paging overload, the gNB-CU may decide to reduce the frequency of paging messages in the affected cells or not to page in those cells unless strictly necessary.

According to certain embodiments, the gNB-DU may provide a notification of such event also on a per beam level. For example, the gNB-DU could, together with the cell affected by the overload, provide an indication of the beam identities for which paging resources are in overload. The gNB-CU may, with such information take a more granular decision on whether to reduce paging load. For example, the gNB-CU could evaluate whether the beams affected are wide beams of directional beams and depending on that apply the right level of paging reduction.—Public Warning System (PWS) Overload—In certain embodiments, a message or indication is sent by the gNB-DU on a per cell basis to highlight that the resources needed to send PWS messages are in overload. With this information the gNB-CU may be able to delay further PWS messages and avoid that new PWS messages are transmitted while delivery of previous PWS messages is not completed, e.g., due to the long time needed for transmission of such messages at cell edge.

Similar to the case of paging overload, the PWS Overload event can also be signalled on a per beam basis and the CU can take similar actions as for the paging overload with the available per beam granularity.

System Information overload—In certain embodiments, a message or indication is sent by the gNB-DU on a per cell basis to highlight that the resources needed to send System Information encoded by the gNB-CU are in overload. With this information the gNB-CU may be able to delay requests for the DU to deliver system information to the UEs, reschedule the resources or reduce the broadcast System Information.

Similar to the case of paging overload and PWS overload, the System Information overload event can also be signalled on a per beam basis and the CU can take similar actions as for the paging overload and PWS overload with the available per beam granularity.

In this manner, the split portions of the RAN node such as, for example, the DU and CU of the gNB, may indicate errors and statuses on a granular level that enables the CU or DU to take targeted action to correct the errors or improve performance. As discussed above, certain embodiments allow for the indication of problems or faults on at least a cellular level such as, for example, for each cell of the DU, thereby allowing adjustments and actions to correct those problems that may avoid manual adjustments and/or deactivation of the entire DU. Additionally, the increased granularity of information may be used to further enhance the performance of the network.

Figure 4:
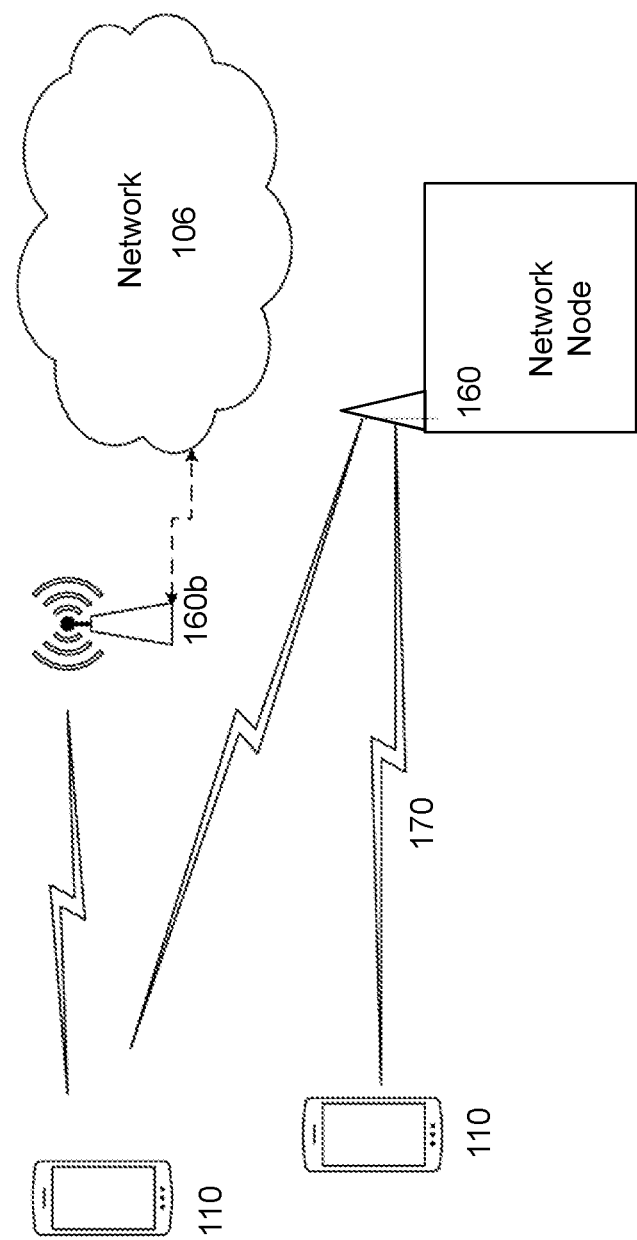
FIG. 4 illustrates an example wireless network, according to certain embodiments.

Although the subject matter described herein may be implemented in any appropriate type of system using any suitable components, the embodiments disclosed herein are described in relation to a wireless network. FIG. 4 illustrates an example wireless network, according to certain embodiments. For simplicity, the wireless network of FIG. 4 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
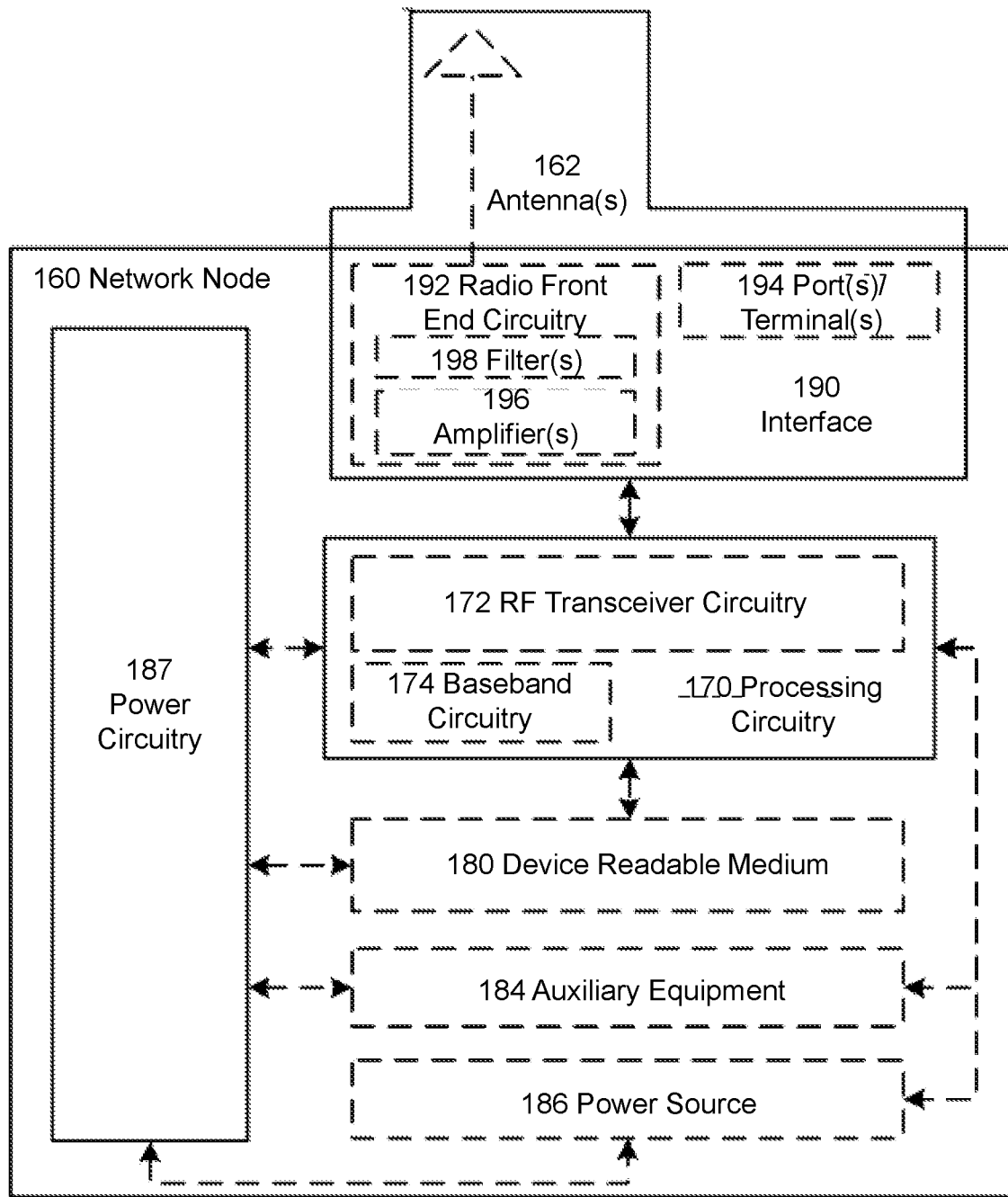
FIG. 5 illustrates an example network node, according to certain embodiments.

FIG. 5 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation & Maintenance (O&M) nodes, Operations Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
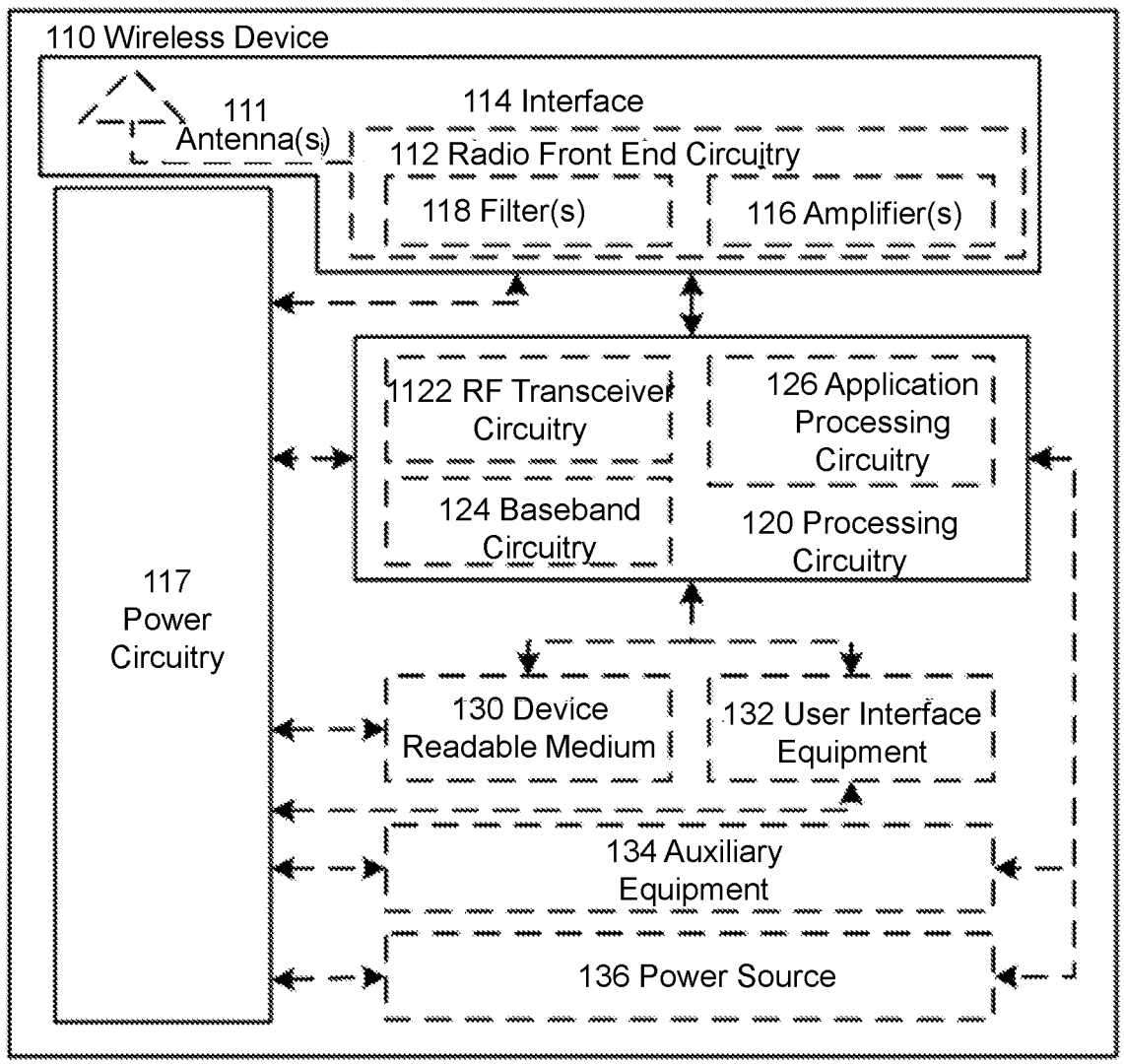
FIG. 6 illustrates an example wireless device, according to certain embodiments.

FIG. 6 illustrates an example wireless device, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a $3^{rd}$ Generation Partnership Project (3GPP) standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
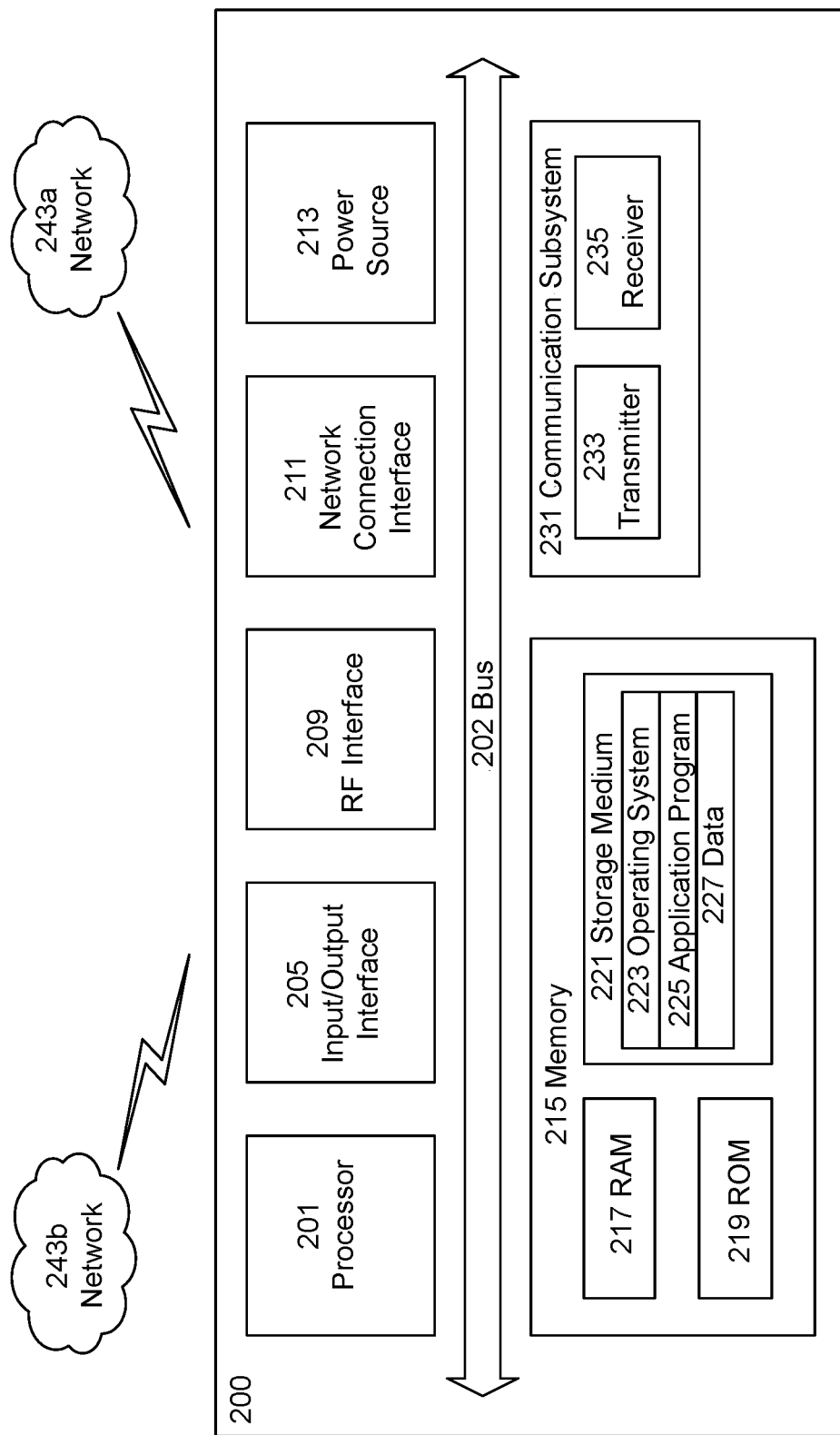
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, Code Division Multiple Access (CDMA), Wide CDMA (WCDMA), Global System for Mobile communication (GSM), LTE, Universal Terrestrial Radio Access Network (U IRAN), WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
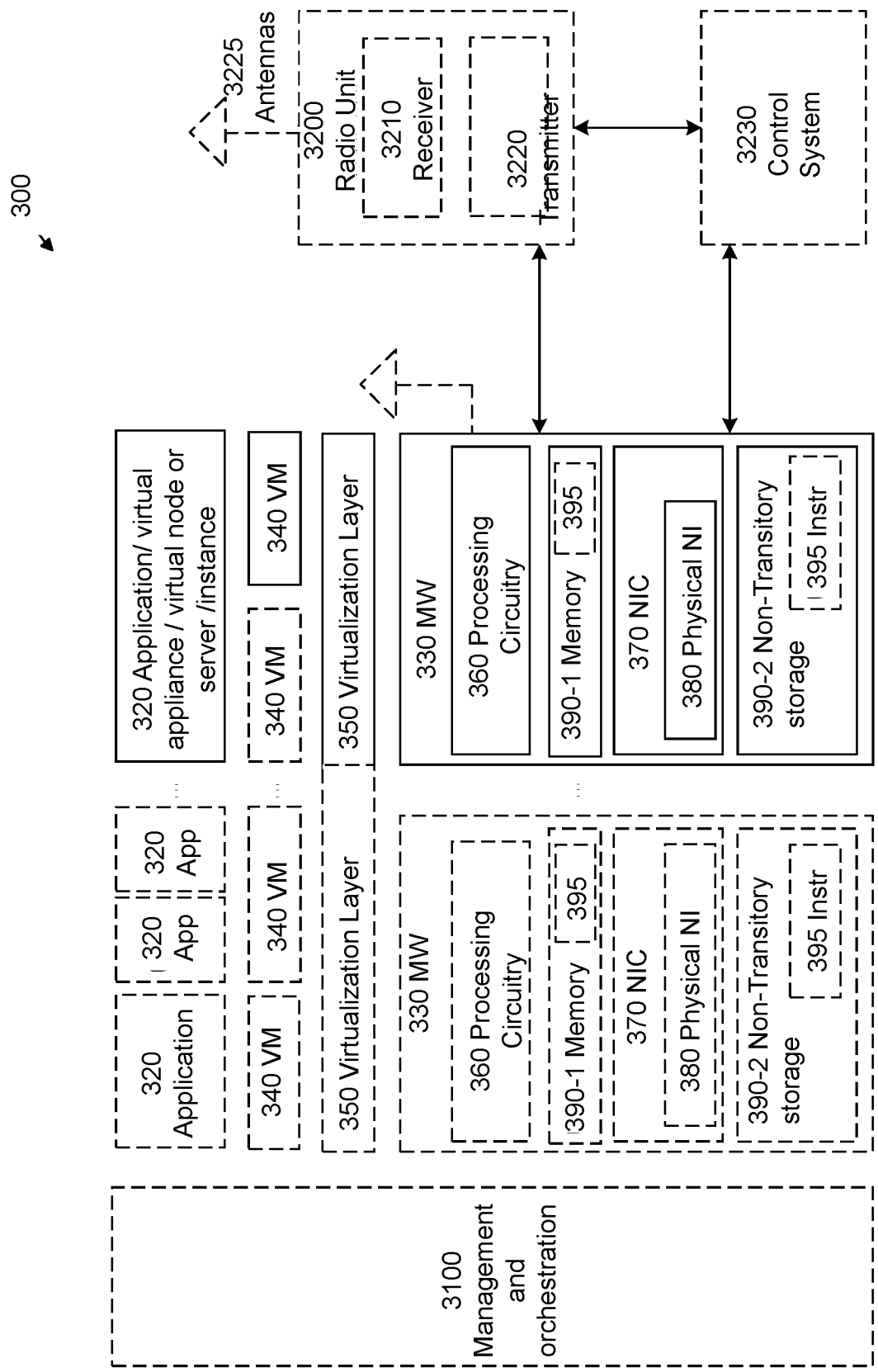
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

Figure 3A:
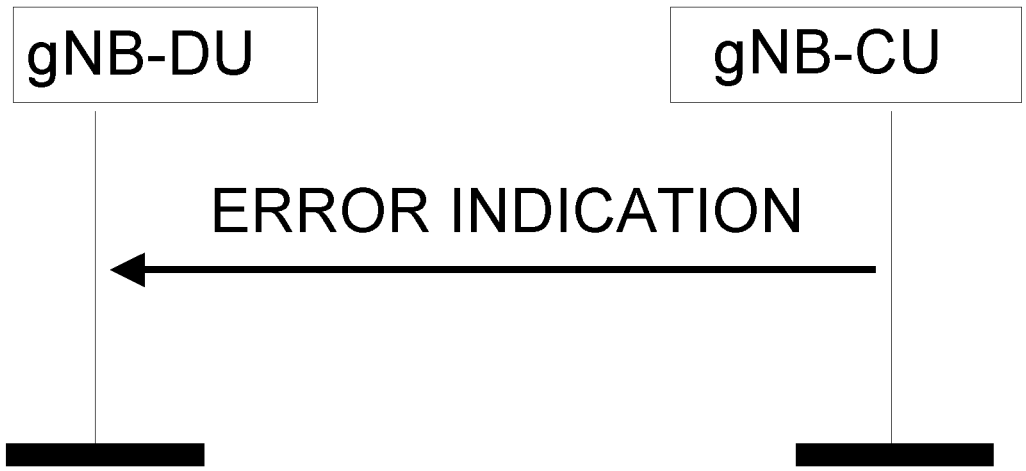
FIGS. 3A and 3B illustrate signalling diagrams for situations where the ERROR INDICATION originates from the gNB-CU and gNB-DU, respectively.
Figure 3B:
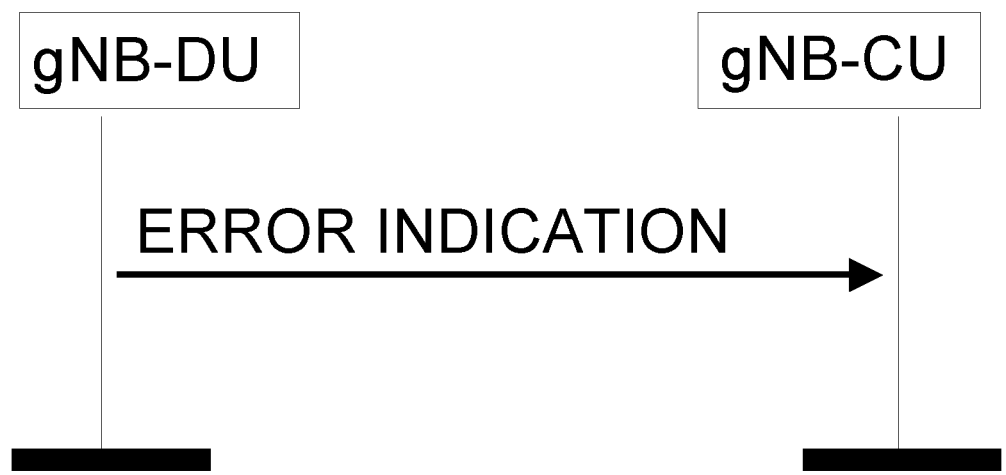

As shown in FIG. 3, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
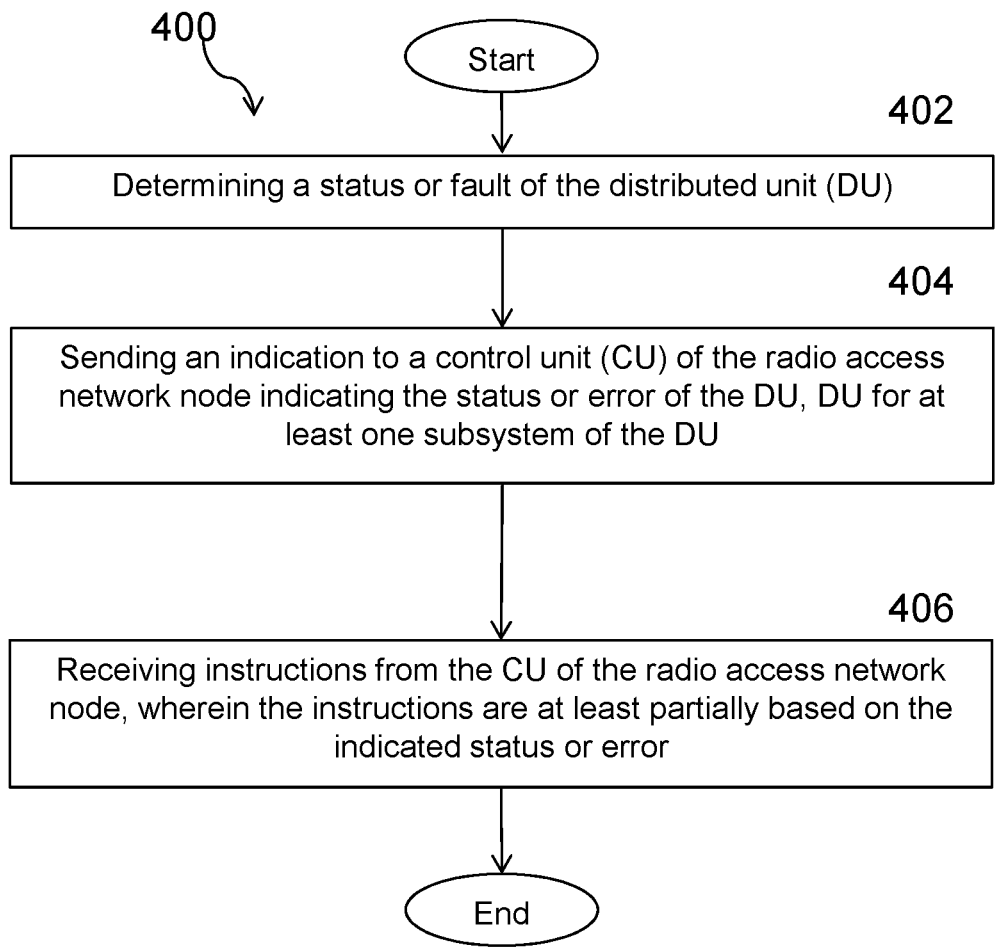
FIG. 9 illustrates an example method by a wireless device, according to certain embodiments.

FIG. 9 depicts a method in accordance with certain embodiments. The method begins at step 402 with determining a status or fault of a distributed unit of a radio access network node. For example, the distributed unit may determine the status or condition of each cell (or beam) of the distributed unit. For each non-optimal or faulty cells (or beams), the distributed unit may determine what is wrong with the cell (or beam). For example, the distributed unit may determine one or more functions of the distributed unit are in overload or not optimally configured, e.g., based on a configuration provided by the control unit.

Based on this determination, at step 404, the distributed unit may send an indication to a control unit of the radio access network node indicating the status or error of the distributed unit. The message may indicate the status or error of the distributed unit for at least one subsystem of the distributed unit. For example, the message may indicate the status or error of at least one cell of the distributed unit. In some embodiments, the message indicates the status or error of the distributed unit on a beam level, e.g., the indication indicates a status or error of a particular beam or set of beams. The indication may indicate one or more functions of the distributed unit to which the status or error applies. For example, the indication may indicate the paging, system information, public warning system, or the user traffic function. The indication may further indicate the issue with the indicated function. For example, the indication may indicate that the paging resources of the distributed unit for one or more cells are in overload. Furthermore, in some embodiments, the indication may further indicate the severity of the issue, e.g., on some predetermined scale. In this manner, the distributed unit can not only provide the status or fault on a cellular basis, but also indicate which function(s) are at fault, what issue is occurring, and/or the level of severity of the issue.

In certain embodiments, the status or fault of the distributed unit comprises a faulty or non-optimal configuration provided by the control unit to the distributed unit. The indication may indicate which parameter(s) of the configuration is faulty or non-optimal. In some embodiments, the indication of which parameter(s) of the configuration is faulty or non-optimal comprises an indication of an index or set of indices corresponding to the parameter(s) that is faulty or non-optimal.

In certain embodiments, the status or fault of the distributed unit comprises one or more of a paging overload, a public warning system overload, and a system information overload. For example, step 402 may comprise determining that one or more cells (or beams) are affected by a paging overload, a public warning system overload, and/or a system information overload. Likewise, the indication may indicate which overload(s) are being experienced one a per-cell (or beam level) basis.

At step 406, the distributed unit receives instructions from the control unit of the radio access network node. The instructions are at least partially based on the indicated status or error. In some embodiments, the instructions from the control unit comprise reconfiguration information. For example, the control unit may determine based on the indication that a different configuration of the indicated cells would improve the performance of the distributed unit and/or the network. In this manner, the control unit may provide targeted instructions based on the more granular indication, thereby reducing the need to manually configure radio access network node or take more drastic steps such as turning off the entire distributed unit. In response the distributed unit may reconfigure one or more cells of the distributed unit based on the received instructions.

In a particular example, the instructions received from the control unit comprise instructions to reduce the frequency of paging messages in one or more of the affected cells (beams). As another example, the instructions received from the control unit comprise instructions to reduce the frequency of or delay further public warning system messages in one or more of the affected cells (beams). As yet another example, the instructions received from the control unit comprise instructions delay requests for the distributed unit to deliver system information to user equipment served by the distributed unit, reschedule the system information resources, or reduce the broadcast System Information in one or more of the affected cells. In this manner, the instructions may provide targeted ways for the distributed unit to reconfigure its transmissions that addresses the overload or other fault conditions on a cellular (or beam level) basis, which mitigates the impact on the network. Accordingly, method 1000 may improve the performance of a network by providing a method for a distributed unit in a split architecture radio access network node to indicate the status or fault of the distributed unit with a granularity sufficient for the control unit to take targeted action to improve network performance.

Figure 10:
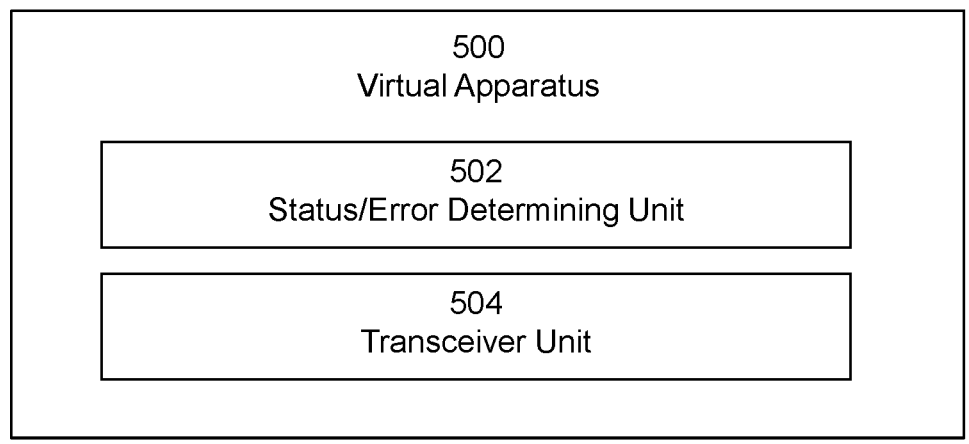
FIG. 10 illustrates an exemplary virtual computing device, according to certain embodiments.

FIG. 10 illustrates a schematic block diagram of an apparatus 500 in a wireless network (for example, the wireless network shown in FIG. 4). The apparatus may be implemented in a wireless device or network node (e.g., wireless device 110 or network node 160 shown in FIG. 4) or some subcomponent thereof, such as a CU or a DU of a radio access network node described herein. Apparatus 500 is operable to carry out the example method described with reference to FIG. 9 and possibly any other processes or methods disclosed herein. It is also to be understood that the method of FIG. 9 is not necessarily carried out solely by apparatus 500. At least some operations of the method can be performed by one or more other entities.

Virtual Apparatus 500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Status/Error Determining unit 502, Transceiver unit 504, and any other suitable units of apparatus 500 to perform corresponding functions according one or more embodiments of the present disclosure.

As illustrated in FIG. 10, apparatus 500 includes Status/Error Determining unit 502 and Transceiver unit 504. Status/Error Determining unit 502 is configured to determine a status or fault of a portion of a split architecture of a radio access network node, e.g., a distributed unit or a control unit of a NR gNB. For example, the distributed unit may determine the status or condition of each cell (or beam) of the distributed unit. For each non-optimal or faulty cells (or beams), the distributed unit may determine what is wrong with the cell (or beam). For example, the distributed unit may determine one or more functions of the distributed unit are in overload or not optimally configured, e.g., based on a configuration provided by the control unit.

Transceiver unit 504 is configured to send an indication to another portion of the radio access network node indicating the status or error determined by Status/Error Determining unit 502. For example, Transceiver unit 504 may communicate via the F1 interface between the distributed unit and the control unit of a NR gNB having a split architecture. The indication may indicate the status or error of a subsystem of the distributed unit. For example, the indication may indicate the status or error of one or more cells of the distributed unit. In some embodiments, the message indicates the status or error of the distributed unit on a beam level, such that the indication includes a status or error of one or more beams of the distributed unit. The indication may indicate one or more functions of the distributed unit to which the status or error applies. For example, the indication may indicate the paging, system information, public warning system, or the user traffic function. The indication may further indicate the issue with the indicated function. For example, the indication may indicate that the paging resources of the distributed unit for one or more cells are in overload. Furthermore, in some embodiments, the indication may further indicate the severity of the issue, e.g., on some predetermined scale. In this manner, the distributed unit can not only provide the status or fault on a cellular basis, but also indicate which function(s) are at fault, what issue is occurring, and/or the level of severity of the issue.

In certain embodiments, the status or fault of the distributed unit comprises one or more of a paging overload, a public warning system overload, and a system information overload. For example, step 502 may comprise determining that one or more cells (or beams) are affected by a paging overload, a public warning system overload, and/or a system information overload. Likewise, the indication may indicate which overload(s) are being experienced one a per-cell (or beam level) basis.

Transceiver unit 504 may be further configured to receive instructions from a control unit of the radio access network node. The instructions are at least partially based on the indicated status or error. In some embodiments, the instructions from the control unit comprise reconfiguration information. In response the distributed unit may reconfigure one or more cells of the distributed unit based on the received instructions.

In a particular example, the instructions received from the control unit comprise instructions to reduce the frequency of paging messages in one or more of the affected cells (beams). As another example, the instructions received from the control unit comprise instructions to reduce the frequency of or delay further public warning system messages in one or more of the affected cells (beams). As yet another example, the instructions received from the control unit comprise instructions delay requests for the distributed unit to deliver system information to user equipment served by the distributed unit, reschedule the system information resources, or reduce the broadcast System Information in one or more of the affected cells. Accordingly, Virtual Apparatus 500 may improve the performance of a network indicating the status or fault of a distributed unit or control unit with a granularity sufficient to take targeted action to improve network performance.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 11:
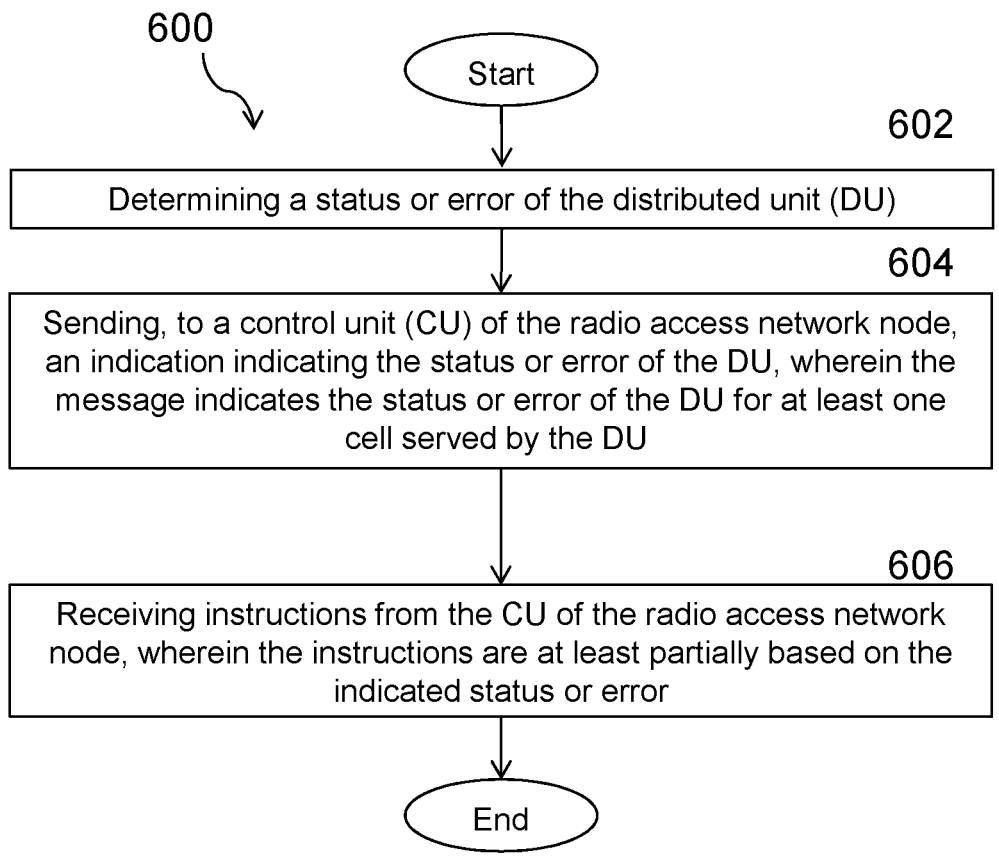
FIG. 11 illustrates an example method by a network node, according to certain embodiments.

FIG. 11 illustrates an example method 600 performed by a network node 115, according to certain embodiments. In a particular embodiment, the network node includes a radio access network node having a split architecture and the method is performed by the DU of the radio access network node.

According to certain embodiments, the method begins at step 602 when the DU determines a status or error of the DU. At step 604, the DU sends, to a CU of the radio access network node, an indication indicating the status or error of the DU. The message indicates the status or error of the DU for at least one cell served by the DU and/or at least one functionality performed by the DU. At step 606, the DU receives instructions from the CU of the radio access network node. The instructions are at least partially based on the indicated status or error.

In a particular embodiment, the instructions from the CU include reconfiguration information, and the DU reconfigures one or more cells of the DU based on the received instructions.

In a particular embodiment, the indication and instructions are communicated between the DU and the CU of the radio access network node via an F1 interface.

In a particular embodiment, the status or error of the DU includes a faulty or non-optimal configuration provided by the CU to the DU, and the indication further indicates that at least one parameter of the configuration is faulty or non-optimal. In a further particular embodiment, the indication includes an indication of an index or set of indices corresponding to the at least one parameter that is faulty or non-optimal.

In a particular embodiment, the indication indicates an issue type and issue severity associated with the status or error, and the issue type is associated with at least one of a paging overload, a public warning system overload, or a system information overload.

In a particular embodiment, the indication includes a set of bits, which include one or more subparts being indicative of the at least one functionality of the DU, an issue with the at least one functionality, and a severity of the issue. The issue with the at least one functionality is associated with at least one of a paging overload, a public warning system overload, and a system information overload.

In a particular embodiment, when determining the status or error of the DU, the DU determines that at least one resource of the DU is in overload. The indication indicates that the at least one cell is affected by the overload of the at least one resource. In a further particular embodiment, the indication indicates one or more beams affected by the overload of the at least one resource.

In a particular embodiment, the at least one resource includes at least one paging resource, and the instructions received from the CU includes instructions to reduce a frequency of paging messages in the at least one cell affected by the overload of the at least one paging resource.

In a particular embodiment, the at least one resource includes at least one paging resource, and the instructions received from the CU instructions to reconfigure a number of paging occasions in the at least one cell affected by the overload of the at least one paging resource.

In a particular embodiment, the at least one resource includes at least one public warning system resource, and the instructions received from the CU includes instructions to reduce a frequency of or delay subsequent public warning system messages in the at least one cell affected by the overload of the at least one public warning system resource.

In a particular embodiment, the at least one resource includes at least one System Information resource, and the instructions received from the CU includes instructions to delay requests for the DU to deliver System Information to user equipment served by the Du, reschedule the at least one System Information resource, or reduce broadcast of the System Information in the at least one cell affected by the overload of the System Information resources.

Figure 12:
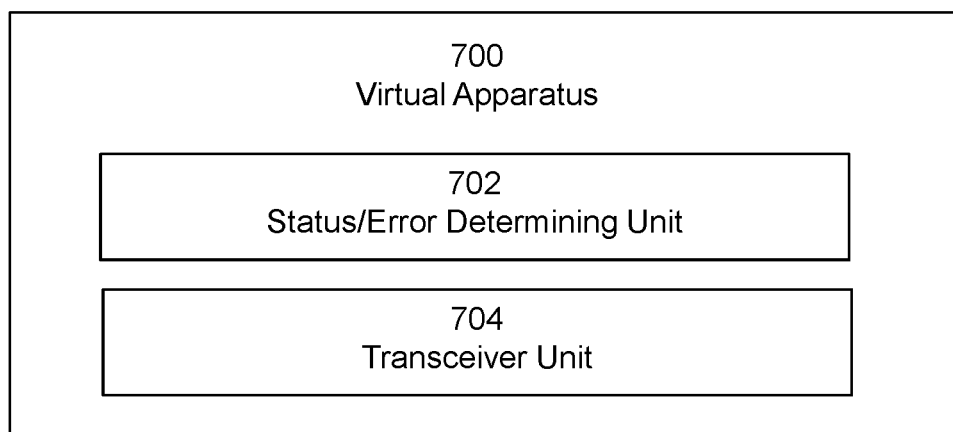
FIG. 12 illustrates another exemplary virtual computing device, according to certain embodiments.

FIG. 12 illustrates a schematic block diagram of an apparatus 700 in a wireless network (for example, the wireless network shown in FIG. 4). The apparatus may be implemented in a wireless device or network node (e.g., wireless device 110 or network node 160 shown in FIG. 4)

or some subcomponent thereof, such as a CU or a DU of a radio access network node described herein. Apparatus 700 is operable to carry out the example method described with reference to FIG. 11 and possibly any other processes or methods disclosed herein. It is also to be understood that the method of FIG. 11 is not necessarily carried out solely by apparatus 700. At least some operations of the method can be performed by one or more other entities.

Virtual Apparatus 700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Status/Error Determining unit 702, Transceiver unit 1304, and any other suitable units of apparatus 700 to perform corresponding functions according one or more embodiments of the present disclosure.

As illustrated in FIG. 12, apparatus 700 includes Status/Error Determining unit 702 and Transceiver unit 704. Status/Error Determining unit 702 is configured to determine a status or error of the DU.

Transceiver unit 704 is configured to send, to a CU of the radio access network node, an indication indicating the status or error of the DU. The message indicates the status or error of the DU for at least one cell served by the DU and/or at least one functionality performed by the DU. Transceiver unit 704 may be further configured to receive instructions from the CU of the radio access network node. The instructions are at least partially based on the indicated status or error.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 13:
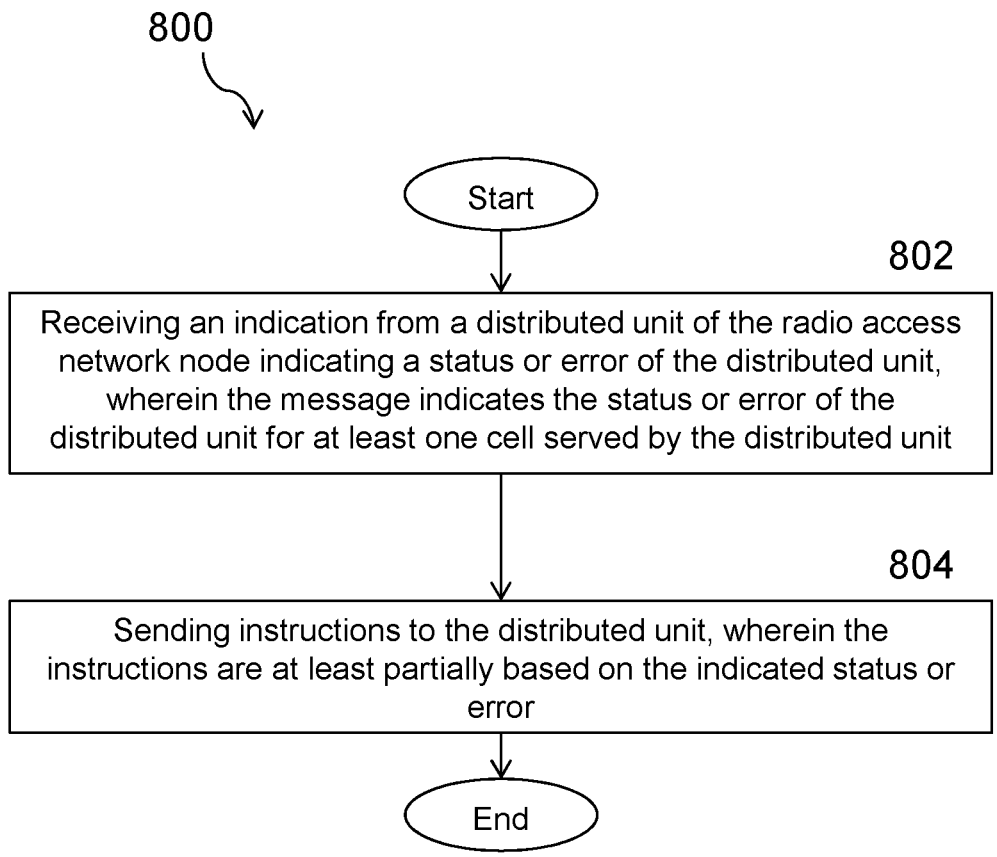
FIG. 13 illustrates an example method by a network node, according to certain embodiments.

FIG. 13 illustrates an example method 800 performed by a network node 115, according to certain embodiments. In a particular embodiment, the network node includes a radio access network node having a split architecture and the method is performed by the CU of the radio access network node.

According to certain embodiments, the method begins at step 802 when the CU receives an indication from a DU of the radio access network node indicating a status or error of the DU. The message indicates the status or error of the DU for at least one cell served by the DU and/or at least one functionality performed by the DU. At step 804, the CU sends instructions to the DU, and the instructions are at least partially based on the indicated status or error.

In a particular embodiment, the instructions include reconfiguration information to reconfigure the at least one cell of the DU based on the received instructions.

In a particular embodiment, the indication and instructions are communicated between the DU and the CU of the radio access network node via an F1 interface.

In a particular embodiment, the status or error of the DU comprises a faulty or non-optimal configuration provided by the CU to the CU, and the indication further indicates that at least one parameter of the configuration is faulty or non-optimal. In a further particular embodiment, the indication of the at least one parameter of the configuration that is faulty or non-optimal comprises an indication of an index or set of indices corresponding to the at least one parameter that is faulty or non-optimal.

In a particular embodiment, the indication indicates an issue type and issue severity associated with the status or error, and the issue type is associated with at least one of a paging overload, a public warning system overload, or a system information overload.

In a particular embodiment, the indication comprises a set of bits, and the set of bits comprise one or more subparts. Each of one or more subparts being indicative of the at least one functionality of the DU, an issue with the at least one functionality, and a severity of the issue. The issue with the at least one functionality is associated with at least one of a paging overload, a public warning system overload, and a system information overload.

In a particular embodiment, the indicated status or fault of the DU includes an indication that at least one resource of the DU is in overload and that the at least one cell is affected by the overload of the at least one resource. In a further particular embodiment, the indication indicates one or more beams affected by the overload of the at least one resource.

In a particular embodiment, the at least one resource includes at least one paging resource, and the instructions include instructions to reduce a frequency of paging messages in the at least one cell affected by the overload of the at least one paging resource.

In a particular embodiment, the at least one resource comprises at least one paging resource, and the instructions include instructions to reconfigure a number of paging occasions in the at least one cell affected by the overload of the at least one paging resource.

In a particular embodiment, the at least one resource includes at least one public warning system resource, and the instructions include instructions to reduce a frequency of or delay subsequent public warning system messages in the at least one cell affected by the overload of the at least one public warning system resource. In a particular embodiment, the at least one resource comprises at least one System Information resource, and the instructions include instructions to delay requests for the DU to deliver System Information to user equipment served by the DU, reschedule the at least one System Information resource, or reduce broadcast of the System Information in the at least one cell affected by the overload of the at least one System Information resource.

Figure 14:
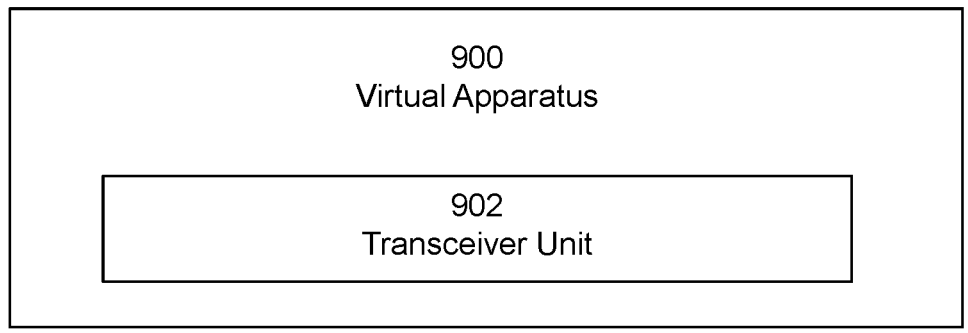
FIG. 14 illustrates another exemplary virtual computing device, according to certain embodiments.

FIG. 14 illustrates a schematic block diagram of an apparatus 900 in a wireless network (for example, the wireless network shown in FIG. 4). The apparatus may be implemented in a wireless device or network node (e.g., wireless device 110 or network node 160 shown in FIG. 4) or some subcomponent thereof, such as a CU or a DU of a radio access network node described herein. Apparatus 900 is operable to carry out the example method described with reference to FIG. 13 and possibly any other processes or methods disclosed herein. It is also to be understood that the method of FIG. 13 is not necessarily carried out solely by apparatus 900. At least some operations of the method can be performed by one or more other entities.

Virtual Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transceiver unit 902 and any other suitable units of apparatus 900 to perform corresponding functions according one or more embodiments of the present disclosure.

As illustrated in FIG. 14, apparatus 900 includes Transceiver unit 904. configured to receives an indication from a DU of the radio access network node indicating a status or error of the DU. The message indicates the status or error of the DU for at least one cell served by the DU and/or at least one functionality performed by the DU.

Transceiver unit 904 is also configured to send instructions to the DU, and the instructions are at least partially based on the indicated status or error.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EXAMPLE EMBODIMENTS

1. A method performed by a wireless device includes communicating with a distributed unit of a radio access network node comprising a split architecture and providing information indicative of network performance to the distributed unit. The distributed unit uses the information indicative of the network performance to indicate a status or error of the distributed unit to a control unit of the radio access network node.

2. The method of any of the previous embodiments, further comprising: providing user data; and forwarding the user data to a host computer via the transmission to the base station.

3. A method performed by a distributed unit of a radio access network node having a split architecture, the method comprising: determining a status or fault of the distributed unit; sending, to a control unit of the radio access network node, an indication indicating the status or error of the distributed unit, wherein the message indicates the status or error of the distributed unit for at least one subsystem of the distributed unit; and receiving instructions from the control unit of the radio access network node, wherein the instructions are at least partially based on the indicated status or error.

4. The method of the previous embodiment, wherein the at least one subsystem of the distributed unit comprises at least one cell served by the distributed unit.

5. The method of any of the previous embodiments, wherein the instructions from the control unit comprise reconfiguration information.

6. The method of any of the previous embodiments, further comprising reconfiguring one or more cells of the distributed unit based on the received instructions.

7. The method of any of the previous embodiments, wherein the indication further indicates one or more functions of the distributed unit to which the status or error applies.

8. The method of the previous embodiment, wherein the one or more functions comprises one or more of paging, system information, public warning system, and user traffic.

9. The method of any of the previous embodiments, wherein the indication and instructions are communicated between the distributed unit and the control unit of the radio access network node via an F1 interface.

10. The method of any of the previous embodiments, wherein: the status or fault of the distributed unit comprises a faulty or non-optimal configuration provided by the control unit to the distributed unit; and the indication further indicates which parameter(s) of the configuration is faulty or non-optimal.

11. The method of the previous embodiment, wherein the indication of which parameter(s) of the configuration is faulty or non-optimal comprises an indication of an index or set of indices corresponding to the parameter(s) that is faulty or non-optimal.

12. The method of any of the previous embodiments, wherein the indication indicates an issue type and issue severity associated with the status or fault.

13. The method of any of the previous embodiments, wherein the indication comprises a set of bits, and the set of bits comprise one or more subparts. The subparts include one or more of a set of bits indicative of a functionality of the distributed unit, a set of bits indicative of an issue with a functionality, and a set of bits indicative of a severity of the issue.

14. The method of any of the previous embodiments, wherein the status or fault of the distributed unit comprises one or more of a paging overload, a public warning system overload, and a system information overload.

15. The method of any of the previous embodiments, wherein: determining the status or fault of the distributed unit comprises determining that paging resources of the distributed unit are in overload; and the indication indicates one or more cells affected by the paging overload.

16. The method of the previous embodiment, wherein the instructions received from the control unit comprise instructions to reduce the frequency of paging messages in one or more of the affected cells.

17. The method of any of the previous two embodiments, wherein: the indication indicates one or more beams affected by the paging overload; and the instructions comprises instructions to reduce the frequency of paging messages based on which beams are indicated to be affected by the paging overload.

18. The method of any of the previous embodiments, wherein: determining the status or fault of the distributed unit comprises determining that public warning system resources of the distributed unit are in overload; and the indication indicates one or more cells affected by the public warning system overload.

19. The method of the previous embodiment, wherein the instructions received from the control unit comprise instructions to reduce the frequency of or delay further public warning system messages in one or more of the affected cells.

20. The method of any of the previous two embodiments, wherein: the indication indicates one or more beams affected by the public warning system overload; and the instructions comprises instructions to reduce the frequency of or delay further public warning system messages based on which beams are indicated to be affected by the public warning system overload.

21. The method of any of the previous embodiments, wherein: determining the status or fault of the distributed unit comprises determining that System Information resources of the distributed unit are in overload; and the indication indicates one or more cells affected by the System Information overload.

22. The method of the previous embodiment, wherein the instructions received from the control unit comprise instructions delay requests for the distributed unit to deliver system information to user equipment served by the distributed unit, reschedule the system information resources, or reduce the broadcast System Information in one or more of the affected cells.

23. The method of any of the previous two embodiments, wherein: the indication indicates one or more beams affected by the System Information overload; and the instructions include instructions to delay requests for the distributed unit to deliver system information to user equipment served by the distributed unit, reschedule the system information resources, or reduce the broadcast System Information based on which beams are indicated to be affected by the public warning system overload.

24. The method of any of the previous embodiments, wherein the at least one subsystem of the distributed unit comprises at least one beam of the distributed unit.

25. A method performed by a control unit of a radio access network node having a split architecture, the method comprising: determining a status or fault of the control unit; sending an indication to a distributed unit of the radio access network node indicating the status or error of the control unit, wherein the message indicates the status or error of the distributed unit for at least one subsystem of the control unit.

26. A method performed by a control unit of a radio access network node having a split architecture, the method comprising: receiving an indication from a distributed unit of the radio access network node indicating a status or error of the distributed unit, wherein the message indicates the status or error of the distributed unit for at least one subsystem of the distributed unit; and sending instructions to the distributed unit, wherein the instructions are at least partially based on the indicated status or error.

27. The method of the previous embodiment, wherein the at least one subsystem of the distributed unit comprises at least one cell served by the distributed unit.

28. The method of any of the embodiments 26-27, wherein the instructions comprise reconfiguration information for the distributed unit.

29. The method of any of embodiments 26-28, further comprising reconfiguring one or more cells of the distributed unit based on the received instructions.

30. The method of any of embodiments 26-29, wherein the indication further indicates one or more functions of the distributed unit to which the status or error applies.

31. The method of the previous embodiment, wherein the one or more functions comprises one or more of paging, system information, public warning system, and user traffic.

32. The method of any of embodiments 26-31, wherein the indication and instructions are communicated between the distributed unit and the control unit of the radio access network node via an F1 interface.]

33. The method of any of embodiments 26-32, wherein: the status or fault of the distributed unit comprises a faulty or non-optimal configuration provided by the control unit to the distributed unit; and the indication further indicates which parameter(s) of the configuration is faulty or non-optimal.

34. The method of the previous embodiment, wherein the indication of which parameter(s) of the configuration is faulty or non-optimal comprises an indication of an index or set of indices corresponding to the parameter(s) that is faulty or non-optimal.

35. The method of any of embodiments 26-34, wherein the indication indicates an issue type and issue severity associated with the status or fault.

36. The method of any of embodiments 26-35, wherein the indication comprises a set of bits, wherein the set of bits comprise one or more subparts, the subparts comprising one or more of a set of bits indicative of a functionality of the distributed unit, a set of bits indicative of an issue with a functionality, and a set of bits indicative of a severity of the issue.

37. The method of any of embodiments 26-36, wherein the status or fault of the distributed unit comprises one or more of a paging overload, a public warning system overload, and a system information overload.

38. The method of any of embodiments 26-37, wherein: the indicated status or fault of the distributed unit comprises an indication that paging resources of the distributed unit are in overload; and the indication indicates one or more cells affected by the paging overload.

39. The method of the previous embodiment, wherein the instructions comprise instructions to reduce the frequency of paging messages in one or more of the affected cells.

40. The method of any of the previous two embodiments, wherein: the indication indicates one or more beams affected by the paging overload; and the instructions comprises instructions to reduce the frequency of paging messages based on which beams are indicated to be affected by the paging overload.

41. The method of any of embodiments 26-40, wherein: the indicated status or fault of the distributed unit comprises an indication that public warning system resources of the distributed unit are in overload; and the indication indicates one or more cells affected by the public warning system overload.

42. The method of the previous embodiment, wherein the instructions comprise instructions to reduce the frequency of or delay further public warning system messages in one or more of the affected cells.

43. The method of any of the previous two embodiments, wherein: the indication indicates one or more beams affected by the public warning system overload; and the instructions comprises instructions to reduce the frequency of or delay further public warning system messages based on which beams are indicated to be affected by the public warning system overload.

44. The method of any of embodiments 26-43, wherein: the indicated status or fault of the distributed unit indicates that System Information resources of the distributed unit are in overload; and the indication indicates one or more cells affected by the System Information overload.

45. The method of the previous embodiment, wherein the instructions comprise instructions to delay requests for the distributed unit to deliver system information to user equipment served by the distributed unit, reschedule the system information resources, or reduce the broadcast System Information in one or more of the affected cells.

46. The method of any of the previous two embodiments, wherein: the indication indicates one or more beams affected by the System Information overload; and the instructions comprises instructions to delay requests for the distributed unit to deliver system information to user equipment served by the distributed unit, reschedule the system information resources, or reduce the broadcast System Information based on which beams are indicated to be affected by the public warning system overload.

47. The method of any of embodiments 26-46, wherein the at least one subsystem of the distributed unit comprises at least one beam of the distributed unit.

48. The method of any of the previous embodiments, further comprising: obtaining user data; and forwarding the user data to a host computer or a wireless device.

49. A wireless device, the wireless device comprising: processing circuitry configured to perform any of the steps of any of Example Embodiments 1 to 2; and power supply circuitry configured to supply power to the wireless device.

50. A base station, the base station comprising: processing circuitry configured to perform any of the steps of any of Example Embodiments 3 to 48; power supply circuitry configured to supply power to the base station.

51. A control unit of a radio access network node having a split architecture, the control unit comprising: processing circuitry configured to perform any of the steps of any of embodiments 24-48; power supply circuitry configured to supply power to the control unit.

52. A distributed unit of a radio access network node having a split architecture, the control unit comprising: processing circuitry configured to perform any of the steps of any of embodiments 3-23 and 48; power supply circuitry configured to supply power to the distributed unit.

53. A user equipment (UE), the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Example Embodiments 1 to 2; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

54. A computer program, the computer program comprising instructions which when executed on a computer perform any of the steps of any of Example Embodiments 1 to 2.

55. A computer program product comprising a computer program, the computer program comprising instructions which when executed on a computer perform any of the steps of any of Example Embodiments 1 to 2.

56. A non-transitory computer-readable storage medium or carrier comprising a computer program, the computer program comprising instructions which when executed on a computer perform any of the steps of any of Example Embodiments 1 to 2.

57. A computer program, the computer program comprising instructions which when executed on a computer perform any of the steps of any of Example Embodiments 3 to 48.

58. A computer program product comprising a computer program, the computer program comprising instructions which when executed on a computer perform any of the steps of any of Example Embodiments 3 to 48.

59. A non-transitory computer-readable storage medium or carrier comprising a computer program, the computer program comprising instructions which when executed on a computer perform any of the steps of any of Example Embodiments 3 to 48.

The invention claimed is:

1. A method performed by a distributed unit of a radio access network node having a split architecture, the method comprising:
    determining a status or error of the distributed unit;
    sending, to a control unit of the radio access network node, an indication indicating the status or error of the distributed unit, the indication indicating one or both of the status or error of the distributed unit for at least one cell served by the distributed unit and at least one functionality performed by the distributed unit, the indication comprising a set of bits, the set of bits comprising one or more subparts, each of the one or more subparts being indicative of the at least one functionality of the distributed unit, an issue with the at least one functionality, and a severity of the issue, the issue with the at least one functionality being associated with at least one of a paging overload, a public warning system overload, and a system information overload; and
    receiving instructions from the control unit of the radio access network node, the instructions being at least partially based on the indicated status or error.

2. The method of claim 1, wherein the instructions from the control unit comprise reconfiguration information, and the method further comprises reconfiguring one or more cells of the distributed unit based on the received instructions.

3. The method of claim 1, wherein the indication and instructions are communicated between the distributed unit and the control unit of the radio access network node via an F1 interface.

4. The method of claim 1, wherein:
    the status or error of the distributed unit comprises a faulty or non-optimal configuration provided by the control unit to the distributed unit; and
    the indication further indicates that at least one parameter of the configuration is faulty or non-optimal.

5. The method of claim 4, wherein the indication of the at least one parameter of the configuration that is faulty or non-optimal comprises an indication of an index or set of indices corresponding to the at least one parameter that is faulty or non-optimal.

6. The method of claim 1, wherein the indication indicates an issue type and issue severity associated with the status or error, and wherein the issue type is associated with at least one of a paging overload, a public warning system overload, or a system information overload.

7. The method of claim 1, wherein:
   determining the status or error of the distributed unit comprises determining that at least one resource of the distributed unit is in overload; and
   the indication indicates that the at least one cell is affected by the overload of the at least one resource.

8. The method of claim 7, wherein the indication indicates one or more beams affected by the overload of the at least one resource.

9. The method of claim 7, wherein:
   the at least one resource comprises at least one paging resource, and
   the instructions received from the control unit comprise instructions to reduce a frequency of paging messages in the at least one cell affected by the overload of the at least one paging resource.

10. The method of claim 7, wherein:
    the at least one resource comprises at least one paging resource, and
    the instructions received from the control unit comprise instructions to reconfigure a number of paging occasions in the at least one cell affected by the overload of the at least one paging resource.

11. The method of claim 7, wherein:
    the at least one resource comprises at least one public warning system resource, and
    the instructions received from the control unit comprise instructions to reduce a frequency of or delay subsequent public warning system messages in the at least one cell affected by the overload of the at least one public warning system resource.

12. The method of claim 7, wherein:
    the at least one resource comprises at least one System Information resource, and
    the instructions received from the control unit comprise instructions to delay requests for the distributed unit to deliver System Information to user equipment served by the distributed unit, reschedule the at least one System Information resource, or reduce broadcast of the System Information in the at least one cell affected by the overload of the System Information resources.

13. A method performed by a control unit of a radio access network node having a split architecture, the method comprising:
    receiving an indication from a distributed unit of the radio access network node indicating a status or error of the distributed unit, the indication indicating one or both of the status or error of the distributed unit for at least one cell served by the distributed unit and at least one functionality performed by the distributed unit, the indication comprising a set of bits, the set of bits comprising one or more subparts, each of the one or more subparts being indicative of the at least one functionality of the distributed unit, an issue with the at least one functionality, and a severity of the issue, the issue with the at least one functionality being associated with at least one of a paging overload, a public warning system overload, and a system information overload; and
    sending instructions to the distributed unit, the instructions being at least partially based on the indicated status or error.

14. The method of claim 13, wherein the instructions comprise reconfiguration information to reconfigure the at least one cell of the distributed unit based on the received instructions.

15. The method of claim 13, wherein the indication and instructions are communicated between the distributed unit and the control unit of the radio access network node via an F1 interface.

16. The method of claim 13, wherein:
    the status or error of the distributed unit comprises a faulty or non-optimal configuration provided by the control unit to the distributed unit; and
    the indication further indicates that at least one parameter of the configuration is faulty or non-optimal.

17. The method of claim 16, wherein the indication of the at least one parameter of the configuration that is faulty or non-optimal comprises an indication of an index or set of indices corresponding to the at least one parameter that is faulty or non-optimal.

18. A distributed unit of a radio access network node having a split architecture, the distributed unit comprising:
    processing circuitry configured to:
        determine a status or error of the distributed unit;
        send, to a control unit of the radio access network node, an indication indicating the status or error of the distributed unit, the message indicates indication indicating one or both of the status or error of the distributed unit for at least one cell served by the distributed unit and at least one functionality performed by the distributed unit, the indication comprising a set of bits, the set of bits comprising one or more subparts, each of the one or more subparts being indicative of the at least one functionality of the distributed unit, an issue with the at least one functionality, and a severity of the issue, the issue with the at least one functionality being associated with at least one of a paging overload, a public warning system overload, and a system information overload; and
        receive instructions from the control unit of the radio access network node, the instructions being at least partially based on the indicated status or error.

19. A control unit of a radio access network node having a split architecture, the control unit comprising:
    processing circuitry configured to:
    receive an indication from a distributed unit of the radio access network node indicating a status or error of the distributed unit, the indication indicating one or both of the status or error of the distributed unit for at least one cell served by the distributed unit and at least one functionality performed by the distributed unit, the indication comprising a set of bits, the set of bits comprising one or more subparts, each of the one or more subparts being indicative of the at least one functionality of the distributed unit, an issue with the at least one functionality, and a severity of the issue, the issue with the at least one functionality being associated with at least one of a paging overload, a public warning system overload, and a system information overload; and
    send instructions to the distributed unit, the instructions being at least partially based on the indicated status or error.

* * * * *